United States Patent [19]

Mourey et al.

[11] Patent Number: 4,593,978
[45] Date of Patent: Jun. 10, 1986

[54] SMECTIC LIQUID CRYSTAL COLOR DISPLAY SCREEN

[75] Inventors: Bruno Mourey, Boulogne Billancourt; Michel Hareng, La Norville, both of France

[73] Assignee: Thomson-CSF, Paris, France

[21] Appl. No.: 590,644

[22] Filed: Mar. 19, 1984

[30] Foreign Application Priority Data

Mar. 18, 1983 [FR] France ................... 83 04479

[51] Int. Cl.$^4$ .................................................. G02F 1/13
[52] U.S. Cl. .................... 350/339 F; 350/336; 350/350 S
[58] Field of Search ............... 350/336, 339 F, 350 S, 350/351

[56] References Cited

U.S. PATENT DOCUMENTS 4,006,968  2/1977  Ernstoff et al. ............... 350/339 F
4,202,010  5/1980  Hareng et al. ................ 350/351 X
4,461,715  7/1984  Lu et al. ...................... 350/350 S X

FOREIGN PATENT DOCUMENTS 2083868  12/1971  France .
2310050  11/1976  France .
2389955  12/1978  France .
2451082  10/1980  France .
56-25714   3/1981  Japan ................. 350/339 F
1490110   10/1977  United Kingdom .
2050033   12/1980  United Kingdom .

OTHER PUBLICATIONS

1982 SID International Symposium, Digest of Technical Papers, 1st edition (May 1982), S. Lu et al, "Thermally-Addressed Pleochroic Dye Switching Liquid Crystal Display," pp. 238-239.

Primary Examiner—John K. Corbin
Assistant Examiner—Richard F. Gallivan
Attorney, Agent, or Firm—Oblon, Fisher, Spivak, McClelland & Maier

[57] ABSTRACT

Smectic liquid crystal display screens for displaying a color image. The object of the invention is to obtain a color image from filtering layers deposited on the electrodes of a matrix display screen, the configuration of the electrodes supporting these layers being such that it avoids phenomena of interlineation of the colors.

5 Claims, 4 Drawing Figures

SMECTIC LIQUID CRYSTAL COLOR DISPLAY SCREEN

BACKGROUND OF THE INVENTION

1. Field of the Invention

The invention relates to a display screen with matrix access using the mixed thermal and electric effect and displaying an image or information in color.

2. Description of the Prior Art

It is known to use a composite thermal and electric effect with smectic liquid crystals for forming screens of this type. They may be used either for projection or for direct vision.

Three distinct devices may for example be used each corresponding to a primary color and the images of which are projected with superimposition on a screen so as to restore the original image. The drawback is the large amount of space occupied and the complexity.

Another means of obtaining a color image consists in inserting, in the optical path between an illumination source and a screen, a filter formed of parallel colored strips and combined optically with a display cell. This system only uses a single cell but also has the disadvantage of taking up a lot of space and having to dispose certain elements at well defined distances. It forms the object of a French patent application belonging to the applicant under the national number 79.23.599 and filed on the Sept. 21, 1979.

It is further known (French patent of the applicant filed on the May 5, 1977 under the national number 77.13 738) to obtain a color image from a display cell of the type comprising a layer of material which may be written on by thermal-electric effect, in which dielectric mirrors, alternately red, green and blue, are placed above heating lines and parallel thereto. One of the drawbacks of this device resides in the difficulty of forming these mirrors.

Another method for obtaining one color display device consists in using dichroic coloring matters in solution in a nematic liquid crystal. By using the appropriate electric field, the molecules of the liquid crystal and the dichroic molecules may be slanted to go over from an absorbing state to a non absorbing state. Thus a variation in the orientation of the molecules is transformed into an absorption variation. The elementary point is therefore either transparent or colored, having the color of the diochroic coloring matter dissolved in the liquid crystal. The practical problem which occurs with dichroic coloring matter devices is to find a stable coloring molecule which has a sufficiently good parameter of angular order.

SUMMARY OF THE INVENTION

To overcome these drawbacks, the invention proposes forming a flat trichrome screen, using the mixed thermal and electric effect, by depositing inside the display cell filtering layers formed from a polymer film containing dissolved coloring matters. These filtering layers have the advantage of being much more easily formed than the above mentioned dielectric mirrors. The invention also provides disposing the filtering layers so that they form color triplets in order to avoid colored strip interlineation.

So the invention has as object a smectic liquid crystal display screen of the matrix display type comprising a heating electrode network and a video electrode network enclosing a smectic liquid crystal layer, said screen restoring a color image from polychromatic radiation incident to the screen, said image being the result of the elementary display points formed by the intersection of heating electrodes and the video electrodes, said screen also comprising means for selecting at least two primary colors of said radiation, said selection means being formed by filtering deposits placed at the elementary display points and supported by the electrodes of at least one of said networks, said filtering deposits being grouped in multiplets of primary colors, wherein the configuration of the electrodes and the arrangement of the multiplets are such that the filtering elements in the same alignment effect differentiated filtering so as to avoid alignment of the deposits of the same color.

BRIEF DESCRIPTION OF THE DRAWINGS

The invention will be better understood and other advantages will appear from the following description with reference to the accompanying Figures in which.

DETAILED DESCRIPTION OF THE PREFERRED EMBODIMENTS

Figure 1:
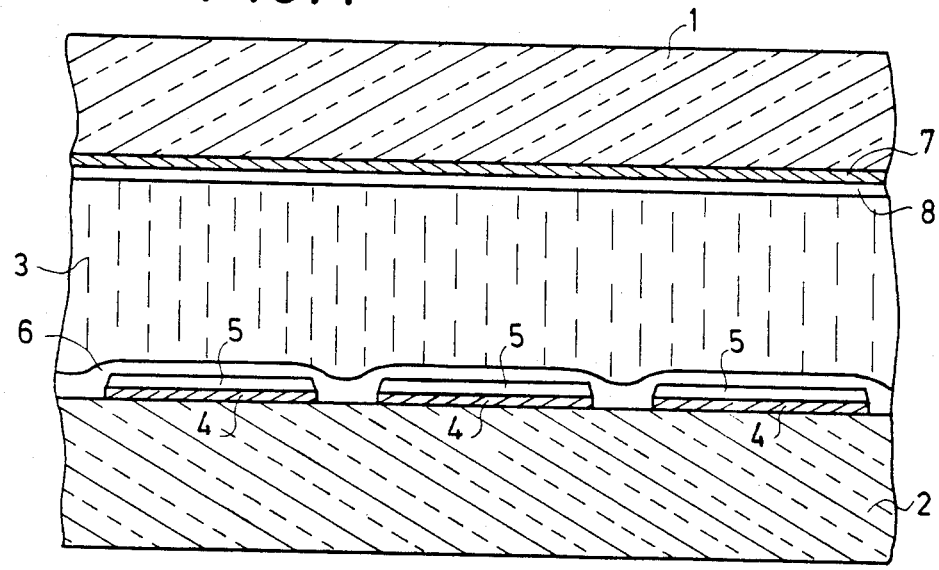
FIG. 1 is a partial cross sectional view of a smectic liquid crystal cell in accordance with the invention.

FIG. 1 is a partial cross sectional view of a smectic liquid crystal cell according to the invention. This cell may serve directly as screen or the image delivered by the cell may be projected on a screen. It comprises two plates 1 and 2 whose thickness may be between 0.5 and 3 mm. Depending on whether the cell will be used for reflection or for transmission, the substrate 2 may be chosen opaque or transparent. Plate 1 will be transparent, for example made from glass. The space between plates 1 and 2, about 12 micrometers thick and defined by spacers not shown, is filled with a liquid crystal layer 3 having at least a smectic phase. This will for example be a mixture of biphenyls such as:

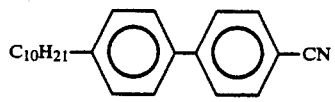

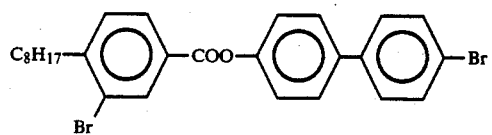

which has the following phase transitions:

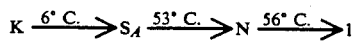

Electrodes 4 provide heating of the liquid crystal. They are generally metal and reflecting, made for example from aluminium. For a cell working with transmission, they may be made from a transparent conducting material such as combined indium and tin oxide (electrodes ITO). Each electrode 4 is covered with a series of studs 5 formed from a thin deposit of polymer in which coloring matters have been dissolved and which will form the filtering layers. The internal face of substrate 2 supporting electrodes 4 and studs 5 may be coated with a thin polyimide layer 6. The purpose of layer 6 is to protect the polymer studs from the possibly corrosive action of the liquid crystal. A thin silane layer may be deposited on top.

Plate 1 supports a series of transparent electrodes 7, made for example from combined indium and tin oxide, placed so as to intersect electrodes 4. It also receives a thin silane layer 8 serving as surfactant which allows the liquid crystal molecules to be orientated homotropously.

It is advantageous to dispose electrodes 4 and 7 so that they form a matrix system. Electrodes 4 form a first network of parallel strips. They will for example form the line connections of the matrix system. Electrodes 7 form a second network of parallel strips disposed substantially orthogonally to electrodes 4. They will form the column connections of the matrix system. The intersection of the electrodes of the two networks define elementary display points.

For practical reasons of construction, a series of studs 5 of a given color correspond to each heating electrode 4. The restoration of a color image from primary colors: red, green and blue is provided by an alternation of electrodes supporting studs of a given color. Since each color element forming the image is the resultant of a triplet of primary colors, so as to obtain the same definition as with a monochrome screen, a number of heating electrodes three times greater must be provided.

In matrix access display screens which supply non colored images, the line connections are formed of parallel rectilinear strips. The same goes for the column connections. This arrangement is satisfactory in the case of black and white operating screens. In the case of a colored screen, such an arrangement would lead to interlineation of the colored strips which is fairly disagreeable to the view. To overcome this disadvantage, the invention proposes giving to the electrodes which support the colored studs a particular shape which allows the elementary color triplet to be distributed alternately above and below an imaginary straight line.

Figure 2:
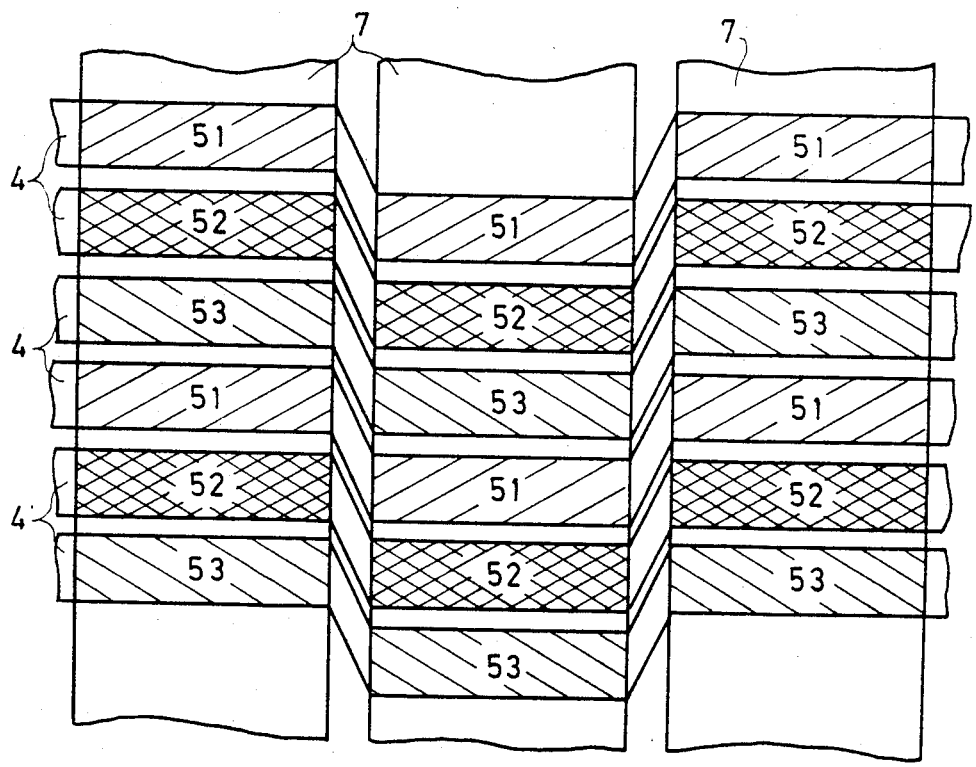
FIG. 2 is a front view of a screen showing the lay out of the different electrodes.

FIG. 2 is a front view of a screen which shows the arrangements of the different electrodes. The view has been shown from the column electrodes side which are transparent in the above described case. For the sake of simplicity, it only shows the line and column electrodes as well as the colored studs. Under the column connection 7 formed from transparent parallel strips can be seen the line connections 4. These latter are formed from a succession of sections placed along the broken line. The section situated under the column electrodes and facing them are orthogonal thereto. They are connected together by line sections placed obliquely with respect to the matrix network. As can be seen in FIG. 2, the arrangement of the different sections is such that by following a line AA' perpendicular to the column electrodes and situated in the same plane, we pass successively from a line electrode to the line electrode which precedes it numerically speaking and come back to the first mentioned electrode. On each of the sections orthogonal to the column electrodes are placed colored studs, to each line electrode 4 a color is assigned and each one is located between electrodes to which complementary colors are assigned. Thus an alternation of basic colors is obtained. For example, a first electrode supports red studs 51, the next one green studs 52 and the one which follows blue studs 53. Along the same column electrode, we then find a succession of colored triplets formed by studs 51, 52 and 53. Since the line electrodes are imbricated in each other, interlineation of the colored strips is thus avoided. An examination of FIG. 2 shows that from one column to the other the triplets are staggered by one color. It is of course possible to stagger them more but the consequences of the staggering on the oblique connecting sections must be taken into account. In fact, the greater the staggering the more the cross section of the connecting sections is reduced. If the line electrodes serve also as heating strips and the column electrodes as video electrodes, it will be readily understood that a certain uniformity of cross section must be kept for the heating electrodes since the heating current which flows therethrough is of the order of 1A. It would be possible to keep an identical cross section along the whole of the line electrodes by modifying the thickness of the metal deposits but that appreciably complicates the manufacture of the screens. An arrangement such as the one shown in FIG. 2 represents an excellent compromise. It can also be seen that each line electrode 4 has a width about three times smaller than that of the column electrodes so as to be able to have three basic colors.

The operating principle is as follows. The well known thermal and electric effect in smectic liquid crystal screens is used which allows two stable states to be obtained, one diffusing and the other transparent. In a monochrome screen, because of the specular reflection occuring on the metal heating electrodes, a transparent point appears black and a diffusing point appears white. By associating a colored filter with each point of the screen, the transparent point will also appear black, whereas a diffusing point will appear in the color of the corresponding filter. If it is desired to obtain color shading, it is sufficient to adjust the values of the video voltages so as to obtain them.

To obtain a colored display on a black background, contrast inversion must be used, that is to say a video voltage is applied for obtaining a black point and no voltage is applied for obtaining a colored point.

The part of the description which follows will relate to the practical construction of a display screen such as the one which has just been described. With respect to the display screens of the prior art, the differences of construction relate to the following points: the heating electrodes and the colored triplets. In the case of metal heating electrodes, they may be obtained by thin layer etching following the shapes shown in FIG. 2. Formation of the colored triplets may be provided in the following way:

by using a turn table, depositing a thin layer (at most two micrometers thick) of a colored photosensitive polymer on the surface of plate 2 supporting electrodes 4. The polymer may be a polyimide or gelatine and the coloring agent, corresponding to one of the basic colors, must have the properties of dissolving well in the polymer used and supporting reheating.

illumination through a mask of the studs to be kept, chemical etching of the unilluminated parts,
reheating of the studs obtained so as to increase the resistance thereof,
deposit and etching of studs corresponding to the other colors by the same process as above.

All the other operations such as deposition of achorage layers, the formation of column electrodes are operations well known to the manufacturers of display screens.

Each color triplet will, depending on the additive process, allow eight different tints to be obtained depending on the diffusing or non diffusing state of the parts of the liquid crystal layer situated opposite the studs of the triplet: green, blue, red, black, white (blue+green+red), cyan (blue+green), magenta (blue+red) and yellow (green+red).

Figure 3:
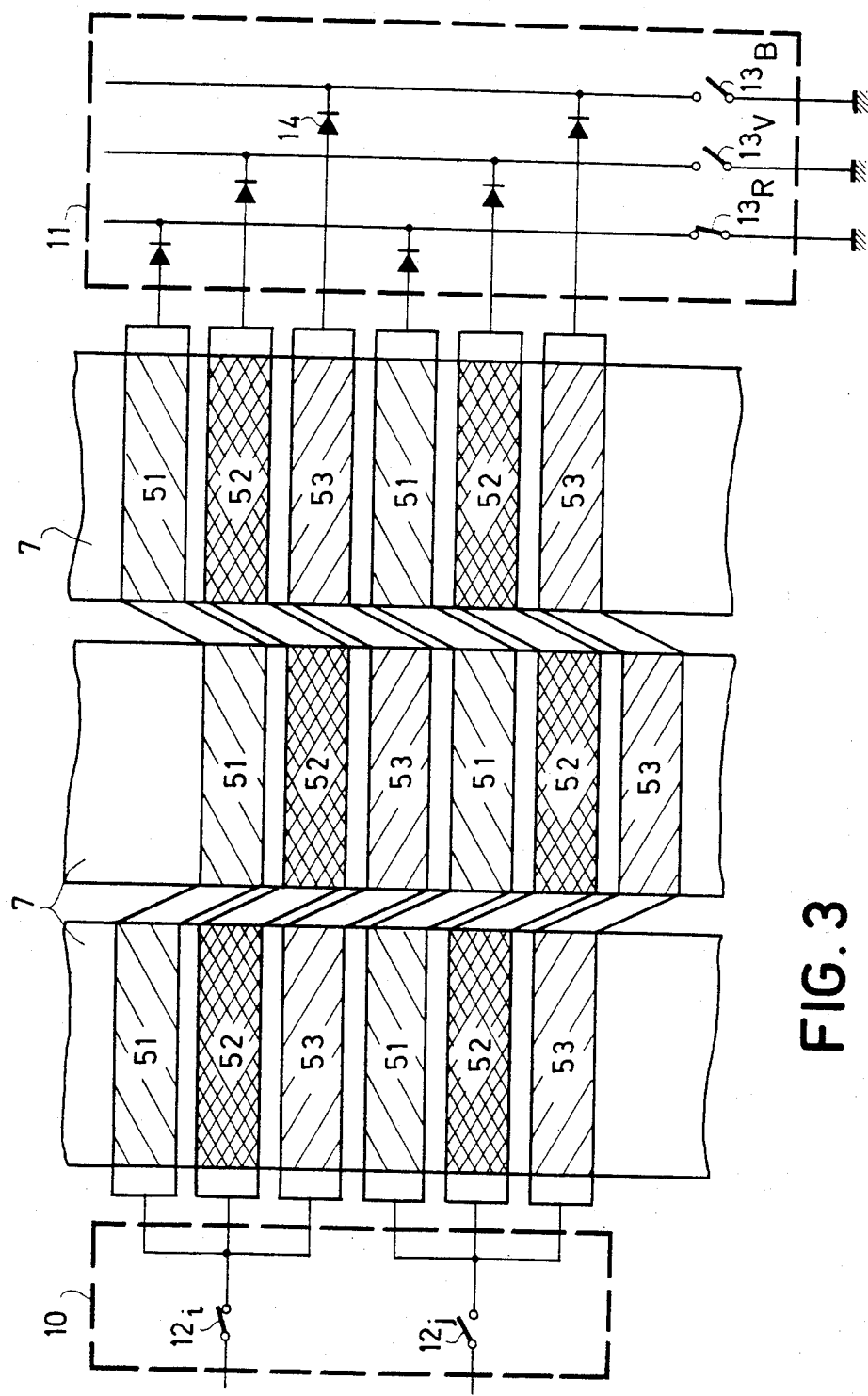
FIG. 3 shows an electric diagram relative to the control of the screen in accordance with the invention.

The display device of the invention lends itself very well to the technique of multiplexing. Some control circuits may of course be adapted depending on the modifications made to the screen with respect to a screen delivering a black and white image. These modifications concern especially line addressing in the above described case. FIG. 3 shows one example of adaptation to be made in the electronic unit for controlling line addressing. It reproduces the electrode matrix system shown in FIG. 2 with the same references. FIG. 3 also comprises elements 10 and 11 which form part of the line control circuit. Element 10 comprises the control of the lines grouped together in color triplets. This control may be achieved by means of a transistor which is shown functionally by a switch: 12$i$ for the group of lines i, 12$j$ for the next group. Element 11 comprises a control of the choice of colors. The selection of the colors may be made by grounding a heating electrode through transistors shown functionally by switches 13$_R$, 13$_V$ or 13$_B$. The indices R, V, and B correspond to the colors red, green and blue. The excitation of a line occurs in the following way. For example, for the red line corresponding to the group of lines i, switches 12$i$ and 13$_R$ will be closed and switches 13$_V$ and 13$_B$ will be open. Thus, a control voltage applied between the group of lines i and ground will cause a heating current to flow in the electrode corresponding to the red color of the group of lines i. To prevent the appearance of parasite voltages on the line electrodes which are not addressed, it is necessary to introduce non linear elements in series with the heating electrodes. In FIG. 3, these elements are diodes 14 which may be placed directly on the screen. The selection of a colored line takes place then by selecting a triplet of lines and a color. This way of operating makes available practically the same number of line control systems as for a monochrome screen.

The particular geometry given to the line electrodes in the above described example is not limitative. The colored studs may be placed either on the line side, or on the column side, or else on both sides. The polymer used for forming these studs may be of the photoresist type or not. In this latter case, etching of the colored studs requires a photosensitive resin to be deposited for conventional photoetching of the polymer by the so called "lift off" technique or by direct etching.

Figure 4:
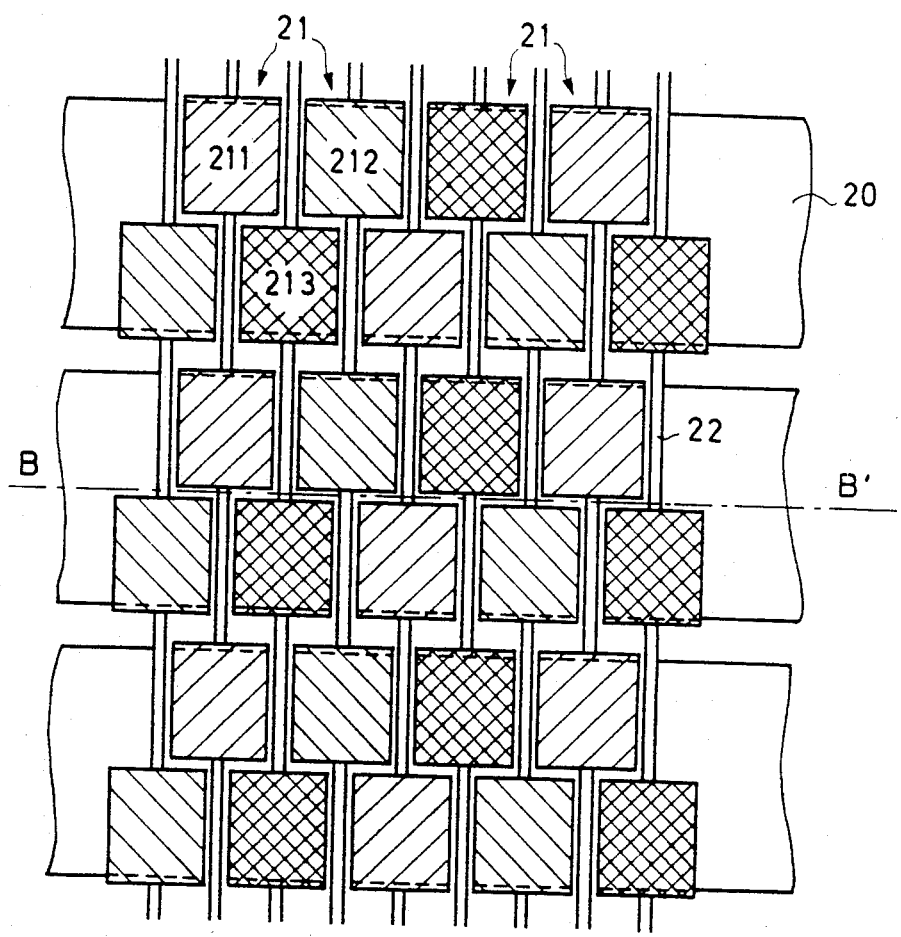
FIG. 4 is a front view of a screen according to a variant of the invention.

FIG. 4 is a front view of a screen according to a variant of the invention. As in FIGS. 2 and 3, only the parts essential for understanding the invention have been shown. This embodiment shows another possible arrangement of the color triplets. This time, it is the column electrodes or video electrodes which have been chosen for defining the elementary display points. The line electrodes 20 are in the form of rectilinear and parallel strips. The column electrodes 21 are formed of small staggered tongues connected together by thin conducting ribbons 22. The number of columns is therefore three times greater than for a monochrome screen of the same format. If the column electrodes do not have passing therethrough a heating current but serve for applying the video voltage, the cross section difference between the tongues and strip 22 presents no particular disadvantage. The tongues may support the colored studs. For example, a color triplet will be formed by tongues 211, 212 and 213 to which the colors green, blue and red correspond respectively. Good covering of the screen is provided with tongues having a substantially square shape and whose sides have dimensions substantially equal to half the width of a line electrode. By placing the colored studs alternately on each side of the axis of symmetry BB′ of a line electrode, the interlineation phenomenon can be avoided.

The effect produced by a dichroic coloring agent, for example black, dissolved in the smectic liquid crystal may also be used. In this case, the reflecting mirror must be replaced by a diffusing background obtained for example, by evaporation of aluminium on a hot substrate. In the presence of a coloring matter and on a diffusing background, a diffusing point will be absorbant and will appear black. A transparent point will be non-absorbant and will appear in the color of the colored stud placed on the diffusing strip. In this configuration, the display device will work under normal contrast.

Since the devices use no dichroic coloring matter, they may be used for projection.

What is claimed is :

1. A smectic liquid crystal display screen of the matrix display type comprising a network of heating electrodes and a network of video electrodes surrounding a smectic liquid crystal layer, said screen restoring a color image from polychromatic radiation incident to the screen, said image being the resultant of the elementary display points formed by the intersection of the heating electrodes and the video electrodes, said screen also comprising means for selecting at least two primary colors of said radiation, said selection means being formed from filtering deposits placed at the elementary display points and supported by the electrodes of a least one of said networks, said filtering deposits being grouped in multiplets of primary colors, wherein the configuration of the electrodes and the arrangement of the multiplets are such that the filtering elements in the same alignment effect differentiated filtering so as to avoid alignment of the deposits of the same color.

2. The display screen as claimed in claim 1, wherein the primary colors are blue, red and green.

3. The display screen as claimed in claim 1, wherein the heating electrodes have a configuration in the form of broken lines comprising parts facing the video electrodes, said parts supporting filtering deposits, each heating electrode supporting deposits of the same color, each filtering deposit being of a different color from that of the deposits which surround it.

4. The display screen as claimed in claim 1, wherein said video electrodes are formed by a string of tongues connected together by thin conducting ribbons, said tongues each supporting a filtering deposit, each video electrode supporting deposits of the same color, each filtering deposit being of a different color from that of the deposits which surround it.

5. The display screen as claimed in claim 1, wherein said liquid crystal layer comprises a dichroic coloring agent in solution.

* * * * *